United States Patent [19]
Duault et al.

[11] Patent Number: 5,638,365
[45] Date of Patent: Jun. 10, 1997

[54] DYNAMICALLY STRUCTURED DATA TRANSFER MECHANISM IN AN ATM NETWORK

[75] Inventors: Maurice Duault, Saint Laurent du Var; Claude Galand, Cagnes sur Mer, both of France

[73] Assignee: International Business Machines Corporation, Armonk, N.Y.

[21] Appl. No.: 526,344

[22] Filed: Sep. 11, 1995

[30] Foreign Application Priority Data

Sep. 19, 1994 [EP] European Pat. Off. ............ 94480088

[51] Int. Cl.$^6$ .......................... H04J 3/26; H04L 12/56
[52] U.S. Cl. .......................... 370/395; 370/426; 370/469
[58] Field of Search .......................... 370/80, 82, 84, 370/85.7, 94.1, 94.2, 95.1, 95.3; 375/225

[56] References Cited

U.S. PATENT DOCUMENTS

| | | | |
|---|---|---|---|
| 5,280,476 | 1/1994 | Kojima et al. | 370/94.1 |
| 5,313,467 | 5/1994 | Varghese et al. | 370/60 |
| 5,414,707 | 5/1995 | Johnston et al. | 370/94.1 |
| 5,541,926 | 7/1996 | Saito et al. | 370/94.2 |

FOREIGN PATENT DOCUMENTS 0214352  8/1985  European Pat. Off. ........ H04L 11/20

OTHER PUBLICATIONS

XIV International Switching Symposium, vol. 2, 25 Oct. 1992, Yokohama pp. 7–11, XP 000337692 D.P. Tranchier, et al Fast Bandwidth Allocation in ATM Networks.

IEEE International Conference on Communications, vol. 2 of 4, 1990 Georgia pp. 439–442, XP 000169724, W. Wang et al, Bandwidth Allocation for ATM Networks.

Computer Networks and ISDN Systems, vol. 24, No. 15, May 1992 Amsterdam, pp. 321–334, XP 000264212 P.E. Boyer et al "A reservation principle with applications to the ATM traffic control".

Data Communications, vol. 23, No. 4, Mar. 1994 New York, pp. 55–60, XP 000432073 S. Saunders "ATM Forum Ponders Congestion Control Options".

*Primary Examiner*—Wellington Chin
*Assistant Examiner*—Soon-Dong Hyun
*Attorney, Agent, or Firm*—Gerald R. Woods; Joseph C. Redmond

[57] ABSTRACT

A method dynamically changes the bit rate or bandwidth of constant bit rate data structures in an Asynchronous Transfer Mode (ATM) communications environment. The method defines within a data channel a Change indicator (CI) indicative of an end user's request for a bit rate change within said data structures. The Change Indicator is continuously transmitted from a source side to a destination side in the ATM environment, along with the data structures on said data channel. Upon receipt at the destination side of a user's request of a bit rate change, the destination side modifies the value of said Change Indicator. The source side, acknowledges the modification of the value of the Change Indicator, whereby the transmission of data structures continues on the data channel with a new constant bit rate.

12 Claims, 12 Drawing Sheets

Table 1. Usage of CSI

| SC | CSI Usage |
|----|-----------|
| 0  | SDT       |
| 1  | SRTS      |
| 2  | SDT       |
| 3  | SRTS      |
| 4  | SDT       |
| 5  | SRTS      |
| 6  | SDT       |
| 7  | SRTS      |

FIG. 2

(a) Non-P Format
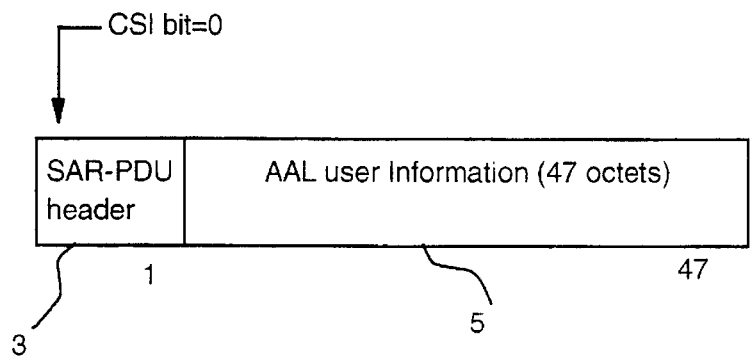
(b) P Format
FIG. 3
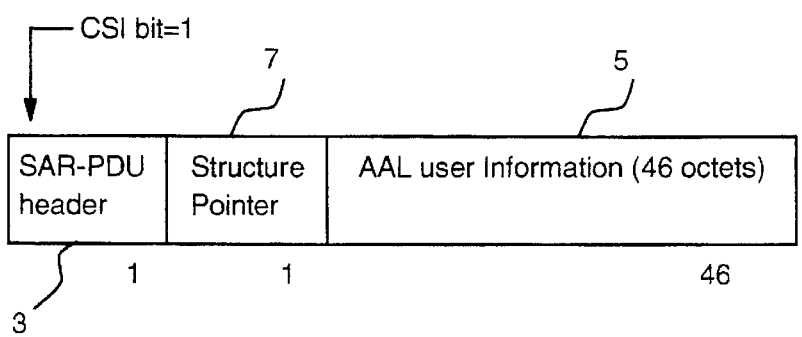
FIG. 4
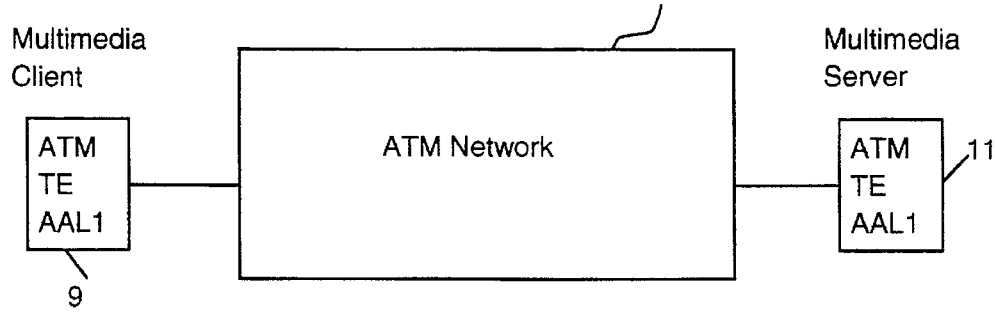
FIG. 5
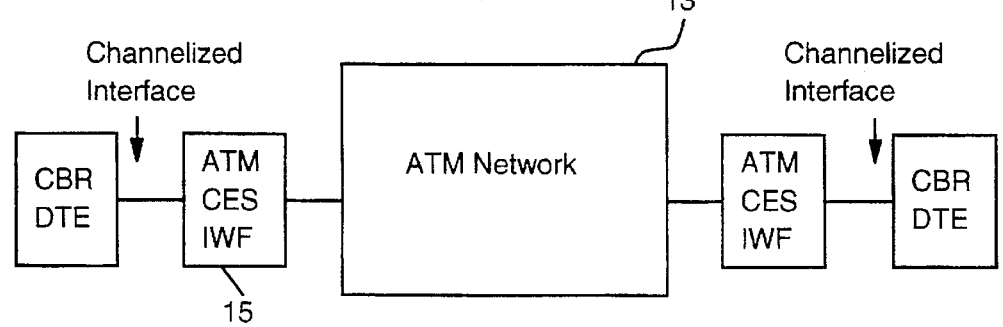

| Change Indicator (CI) with alternate 1 | | |
|---|---|---|
| SC | CSI | CI |
| 0 | 1 | 0 |
| 2 or 4 or 6 | 0 | 0 |
| 0 | 0 | 1 |
| 2 or 4 or 6 | 1 | 1 |

FIG. 6

| Usage of CSI with alternate 2 | |
|---|---|
| SC | CSI Usage |
| 0 | P or non-P format |
| 1 | CI |
| 2 | P or non-P format |
| 3 | CI |
| 4 | P or non-P format |
| 5 | CI |
| 6 | P or non-P format |
| 7 | CI |

FIG. 7

| Usage of CSI with alternate 3 | |
|---|---|
| SC | CSI Usage |
| 0 | P format and CI, or non-P format |
| 1 | SRTS |
| 2 | P format and CI, or non-P format |
| 3 | SRTS |
| 4 | P format and CI, or non-P format |
| 5 | SRTS |
| 6 | P format and CI, or non-P format |
| 7 | SRTS |

FIG. 8

Table 5. Finite State Machine

| State/Event | 1<br>Be Prepared To Receive | 2<br>Send | 3<br>Cancel Change | 4<br>CI inversion |
|---|---|---|---|---|
| 1<br>Idle | 2/3 | 3/2 | ignore | Invalid |
| 2<br>Ready To Change | 2/3 | 1/2 | 1/4 | 1/2 |
| 3<br>Change Sent | Invalid | Invalid | Invalid | 1/2 |

FIG. 12

DYNAMICALLY STRUCTURED DATA TRANSFER MECHANISM IN AN ATM NETWORK

BACKGROUND OF THE INVENTION

1. Field of the Invention

This invention relates to telecommunications networks. More particularly, the invention relates to a method of transferring data in an ATM (Asynchronous Transfer Mode) network and of dynamically changing the length of a structured data transfer (SDT) in such ATM network.

2. Description of the Prior Art

In a digital transmission network, data from a large number of users are serially transmitted from one network node to another network node, up to their respective final destination.

Due to the evolution of networks towards more and more complex mixing of sub-networks with heterogeneous architectures, it is clear that there is a requirement to support distributed computing applications across high speed backbones that may be carrying LAN traffic, voice, video and traffic among channel-attached hosts and workstations.

Fast packet switching is now commonly used to accommodate the bursty, multiprocess communications found in distributed computing environments.

Recently the concept of cell switching has been introduced. Cell switching can be thought of as a high performance form of packet switching. In packet switching networks, the packet size is a fixed maximum, but individual packets may always be shorter than the maximum. In a cell based network, cells have a fixed length. Cells are usually a lot shorter than packets, because the use of short fixed length cells simplifies the hardware needed in each node of the network.

Asynchronous Transfer Mode (ATM) is a protocol for user access to the internal operation of a public high speed cell switching system. This protocol is suitable for all kinds of traffic: data, voice, image, video.

In order to make an ATM network practical, it is necessary to adapt the internal network characteristics to those of the various traffic types that will use the network. This is the purpose of the ATM Adaptation Layer (AAL). The function of the AAL is thus to provide generalized interworking across the ATM network. The AAL function operates an end-to-end protocol across the ATM network to provide support for end users of different classes of service corresponding to generic classes of network traffic.

One of these classes (Class One) is intended for constant rate voice and video applications. Class one requires the following environment, in which the present invention finds applications: a constant bit rate at source and destination; a timing relationship between source and destination, and the transfer of structured information between source and destination.

Communication methods that satisfy these requirements are disclosed in Revised Recommendation I.363 from CCITT, which is included herein by reference.

This Recommendation describes the interactions between the AAL and the next higher (OSI) layer, and between the AAL and the ATM layer (sub-layer of layer 1). The AAL isolates the higher layers from the specific characteristics of the ATM layer by mapping the Protocol Data Units (PDUs) of the higher layers into the information field of the ATM cell and vice versa. The AAL entities exchange information with the peer AAL entities to support the AAL functions.

To support services above the AAL, some independent functions must be performed in the AAL. These functions are organized in two logical sublayers, the Convergence Sublayer (CS) and the Segmentation and Reassembly sublayer (SAR).

The SAR primary functions are segmentation of higher layer information into a size suitable for the information field of an ATM cell and reassembly of the contents of ATM cell information fields into higher layer information.

The CS primary function is to provide the AAL service at the AAL Service Access Points (SAP).

The SAR sublayer at the transmitting end accepts a 47-byte block of data ($SAR_{13}$ PDU payload) from the CS sublayer and then adds a one byte SAR_PDU header to each block to form the SAR_PDU.

The SAR sublayer at the receiving end receives the 48-byte block of data from the ATM layer and separates the SAR_PDU header from the data payload. The 47-byte block of data of the SAR_PDU payload is then passed to the CS sublayer. The basic AAL1 header is 1 byte long and the payload is 47 bytes long.

One problem arising in a data transfer environment, as described above, is the need to change the constant bit rate of the data that are being exchanged between a transmitting end and a receiving end. Such a need can be inferred from the real time requirements of some multimedia services, where the bit rate should not be constant anymore, but should vary over time according to user demand. An example of such a need is expressed in ITU-T contribution Com 13 D-81 of July 93, by J. Y. Cochennec: ... "after the connection with the server has been established, the user may typically ask for a video sequence, then for commentary, then for audio only, etc. Each time the user formulates a request to the server, the received bit rate may vary, but within a sequence the bit rate will be constant." This means that the bit rate should be dynamically modifiable, while the connection is active.

A similar issue has already been addressed in European Patent Application 0 214 352 A1, published Mar. 18, 1987 relative to a dynamic bandwidth allocation mechanism between circuit slots and packet bit stream in a communication network. This patent application describes a method using a signalling channel and a data channel with associated in-band control. According to the published method, the control is specified in-band (i.e. in the data channel, with only a minimum of associated control information) whether a slot should be added or suppressed, and which slot is impacted. However, this method is not compatible with the AAL1 format, since in AAL1 there is no field containing both the slot add/suppress information and the slot number information. Further, this method is limited to adding or suppressing one slot per call operation. In addition, the source which initiates the change of data structure does not know whether the change using the in-band signalling protocol will be accepted by the destination. Therefore, call contentions are detected after the inband signalling protocol is started. This makes difficult the increase/decrease in the bandwidth of an existing online connection, and guaranteeing the data integrity under the bit rate after a change.

SUMMARY OF THE INVENTION

In this environment, an object of the present invention is a method for transferring structured data at a constant bit rate in an ATM network, the method allowing dynamic change in the length of data structures.

Another object is a method of easily solving contention problems which may arise when a source side (requesting a change) and a destination side (acknowledging a change) want to simultaneously change the length of a data structure.

Another object is a method of guaranteeing data integrity under a new bit rate after a change.

Another object is a method of resolving conflict between a source side and a destination side in a network where both sides want to perform an operation on the same network line.

Another object is a method of simplying an interface between a signalling layer and an ATM Adaption Layer in a telecommunications network.

These and other objects, features and advantages are fulfilled by the invention as described and claimed hereinbelow.

According to the method claimed by the invention, a Change Indicator (CI) is used to indicate a change in a data structure. This Change Indicator is a one-bit logical value, but for greater simplicity of the method, no particular meaning is attached to its value per se (0 or 1), since a change in the data structure is simply indicated by a change in the value of the indicator.

Further, according to the invention, three alternative methods are proposed to introduce and code the Change Indicator (CI) logical value. Two of them keep the same format SAR_PDU as the one currently defined according to AAL1. The third method adds one field to specify CI for Pointer format, i.e. the format of SAR_PDU when there is a pointer (FIG. 3).

According to the invention, the CI is inverted to specify that a data structure has changed. This information (CI change) is transported in the AAL Type 1 header with the data, from a transmitting end to a receiving end. It is associated to the structure of the SAR_PDU transported, and is present permanently up to the next structure change.

Further, the data structure change is simply acknowledged through the inversion of CI in the reverse path, from the receiving end to the transmitting end. No additional Data Link control protocol is needed to perform this function. In other words, whatever the number of SAR_PDUs lost during a transmission in one or the other direction, since the CI indicator is continuously being transmitted with the data, it is not necessary to put into place an additional datalink control protocol.

In order to allow a simple implementation, the CI indicator is implemented in AAL1, while the remaining functions are implemented in the signalling layer.

According to the invention, the change of the CI indicator being transmitted in the reverse path constitutes an acknowledgement of the CI change and ensures that both sides of the data transmission are working with similar data structures.

BRIEF DESCRIPTION OF THE DRAWINGS

The invention will now be described in greater detail with respect to a preferred embodiment thereof, which is further shown in the drawings in which FIGS. 1 to 5 generally pertain to the prior art and to the known environment of the invention.

FIG. 2 is a table which shows the use of a known Convergence Sublayer indicator (CSI) between a SRTS (Synchronous Residual Time Stamp) and a SDT (Structured Data Transfer).

FIG. 3 shows a format of a SAR_PDU in AAL Type 1, with or without a pointer (P or non-P, respectively).

FIG. 4 is a block diagram of a network configuration for supporting multimedia services with native ATM terminal equipment.

FIG. 5 is a block diagram of a network configuration for Circuit Emulation services.

FIG. 6 is a table mapping the CI indicator according to the invention, obtained from a sequence count (SC) and CSI, using a first method.

FIG. 7 is a table defining the CI indicator with a second method.

FIG. 8 is a table defining the CI indicator with a third method.

FIG. 12 is a table showing a Finite State Machine matrix asociated with the Finite State Machine of FIG. 11.

DETAILED DESCRIPTION OF THE INVENTION

Figure 1:
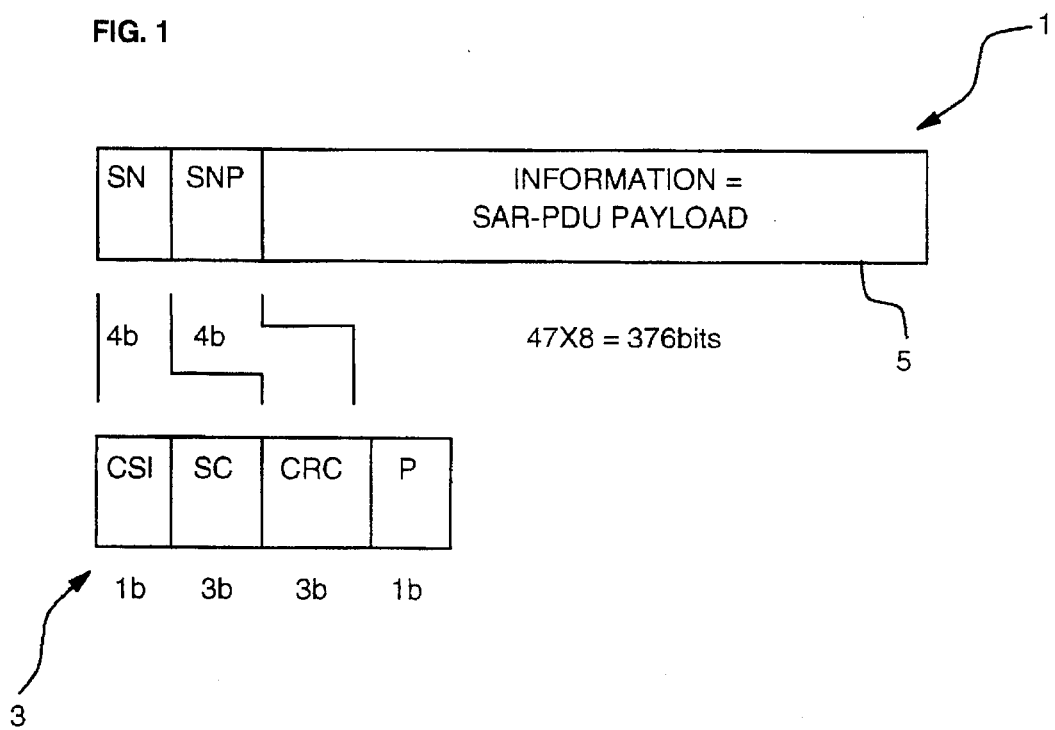
FIG. 1 shows a SAR_PDU format according to AAL Type 1 in the ATM environment.

FIG. 1 represents a SAR_PDU format 1 of AAL Type 1. The SAR_PDU format 1 includes a header field 3 (1 byte) and a SAR_PDU payload field 5 (47 bytes). The meaning of the different fields represented in the figure is given below.

SN : Sequence Number (4bits): the SN field is divided into two subfields CSI and SC as shown.

CSI : Convergence Sublayer Indicator: 1 bit, which carries the CS indication provided by the CS (Convergence Sublayer). The default value of the CSI bit is "0".

SC : Sequence Count (0 to 7): Numbers the ATM cells or SAR_PDUs, which allows to check if a cell or a data unit is lost.

SNP : Sequence Number Protection (4bits): This field provides error detection and correction capabilities over the SAR_PDU header. Its format includes a Cyclic Redundancy Check (CRC) code protecting the SN field, and an even parity check bit protecting the 7 bit codeword as protected by the CRC code.

CRC: Corrects single errors.

P : Parity; Detects double errors.

The CSI is a convergence bit which is defined for multiple purposes, and in particular for SRTS (Synchronous Residual Time Stamp) and for SDT (Structured Data Transfer). The use of CSI is summarized in FIG. 2. More details on the above fields are available in previously mentioned Recommendation I.363.

The format of the Structured Data Transfer (SDT) method according to Recommendation I.363 is shown in FIG. 3, where a basic SAR_PDU contents is represented. The 47 byte SAAR_PDU payload used by the CS has two formats, called non-P (a) and P format (b). The Non-P format of the SAR_PDU refers to the absence of a pointer, and the P format refers to the presence of a pointer. The pointer points to the beginning of the data structure in order to specify its alignment inside the SAR_PDU. In the non-P format, the entire CS-PDU is filled with user information. In the P format, the first byte of the SAR_PDU payload 5 is the pointer field 7. The remainder is filled with user information. This format may be used only if the Sequence Count value SC in the SAR_PDU header is 0,2,4 or 6.

The pointer byte is placed exactly once, at the first available opportunity in every cycle of 8 consecutive cells. The pointer field contains the binary value of the offset, measured in octets, between the end of the pointer field and the first start of the structured block in the 93 octets payload which consists of the remaining 46 octets of this SAR_PDU payload and the 47 octets of the next SAR_PDU payload. Thus, a pointer points in fact to the beginning of a structure within two consecutive SAR_PDUs.

The known Structured Data Transfer (SDT) method permits multiplexing several channels of a channelized interface into an ATM connection. This multiplexing method is static and the number of channels must be constant during all the time of the connection.

In contrast, the Dynamically Structured Data Transfer Method (DSDT), according to the invention, resolves new requirements, such as the ones found in particular in two specific environments, without being limited thereto: the multimedia services environment (FIG. 4) and the circuit emulation service environment (FIG. 5).

FIG. 4 represents a typical multimedia services environment: a multimedia client terminal 9 is connected to a multimedia server terminal 11 through an ATM network 13. The SAR_PDUs according to FIG. 3 will be transmitted between these ATM entities. Both terminals being native ATM terminal equipments, no circuit/ATM interworking function is required. As the client-user asks for real time services at different bit rates (video, audio, etc.), the bit rate of the connection will have to vary, without interrupting the connection. This is allowed by the Dynamically Structured Data Transfer method according to the invention, which will be described in greater detail in relation to FIG. 6 and the following figures.

FIG. 5 shows a network configuration for Circuit Emulation Services (CES). Circuit Emulation Services emulate a circuit switching service with an ATM Terminal Interworking function 15 (IWF). Interconnection of PBXs presents requirements to multiplex serveral Time Division Multiplexing channels in an ATM connection. It has the advantage to decrease the cell payload assembly delay, and to use one connection inside the ATM network for multiple channels at the User to Network Interface (UNI). Each channel is associated with a specific call, and the number of channels may change dynamically inside the ATM connection.

These two applications explain the requirement to define a Dynamically Structured Data Transfer method. Each application has a specific signalling protocol to specify all the parameters that both sides need to exchange; to allocate the necessary bandwidth for the transport of the new data structure; to resolve contention problems when both sides want to change the structure at the same time, and resolve network failure problems. These signalling protocols are part of the signalling layer and are out of the scope of the AAL Type 1. Therefore, only the interface between the signalling layer and the AAL Type 1 will be considered in the remainder of the present description.

Introduction of a new indicator: The data structure Change Indicator CI.

Figure 9:
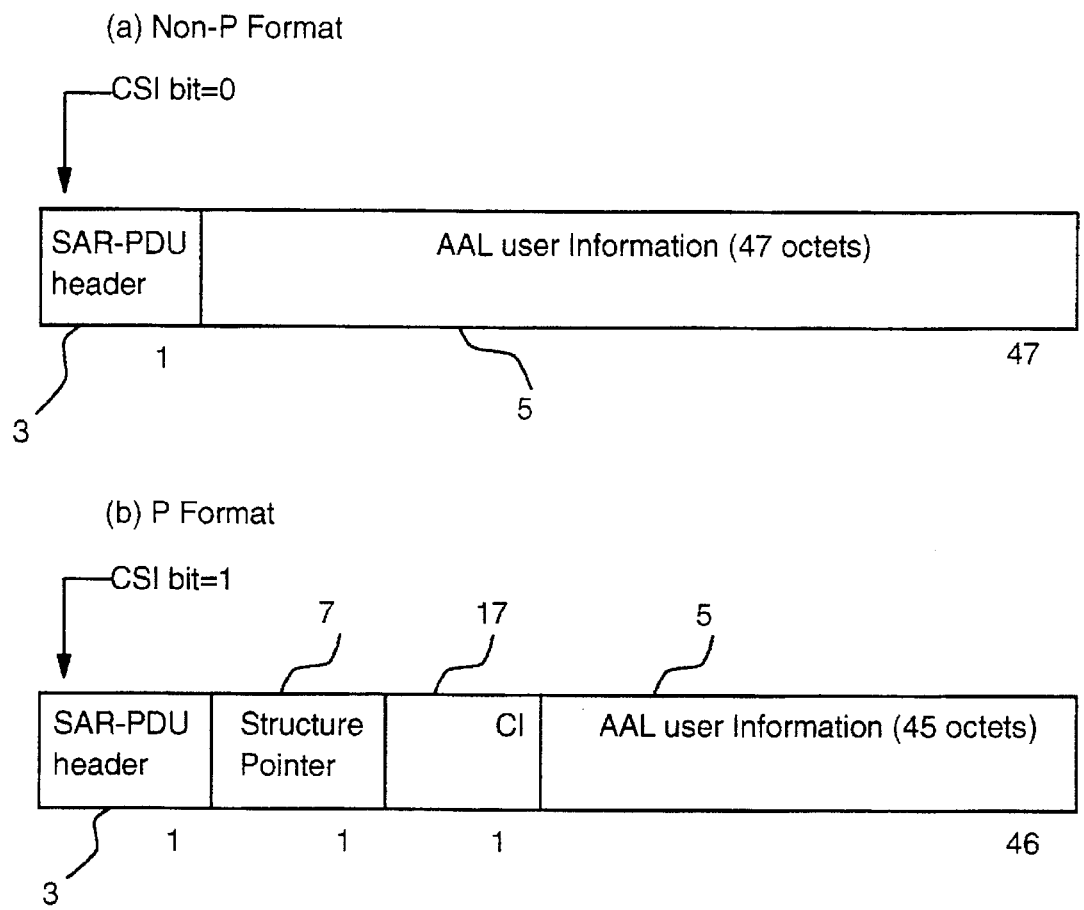
FIG. 9 shows a format for a SAR_PDU in AAL Type 1, with a pointer (P) and a CI indicator, or without a pointer (non-P) and no CI indicator.

According to the invention, a new indicator field 17 is introduced in the data structure (FIG. 9) in order to dynamically change the length of said data structure.

This Change Indicator field 17 contains a one-bit logical value, but for greater simplicity of the method, no particular meaning is attached to its value per se (0 or 1), since a change in the data structure is simply indicated by a change in the value of the indicator: from 0 to 1, or from 1 to 0.

Definition of the Change Indicator CI:

In order to define the change indicator CI, three methods are used, pertaining to three different cases of data structure length. Said methods are described in relation to FIGS. 6 to 8.

First case: the length of the data structure is smaller than 93 bytes (i.e. two SAR_PDUs).

One byte of the structure is usually transmitted every 125 microseconds and is associated with one 64 Kbps channel. Therefore the data structure allows to provide a service up to 5.952 Mbps.

FIG. 6 shows how CI is associated with CSI and the even values of SC, and the pointer generation rule.

When the length of the structure is smaller than 93 octets, and the cell is completely filled, the pointer is always located in the cell with SC=0. With static Structured Data Transfer (SDT), CSI is always equal to 1 for SC=0 (pointer format), and CSI is always equal to 0 for SC=2,4 or 6. The information provided by CSI for even values of SC is redundant with the information provided by SC. According to the invention, it is therefore proposed to code the CI indicator with a new combination of CSI for even values of SC.

Accordingly, the Change Indicator (CI) is defined as being equal to the inverted value of said CSI indicator for a Sequence Count of 0 (SC=0), and equal to the value of said CSI indicator for even values of said sequence count (SC).

Second case: The length of the structure can be greater than 93 octets, and Synchronous Residual Time Stamp (SRTS) is not used.

SRTS is defined for asynchronous clock services. SDT usually uses synchronous clock services. When SDT and SRTS are not used together, dynamic SDT can use the bits reserved for SRTS.

In FIG. 7, CI is located in CSI field for odd values of SC, i.e. the Change Indicator (CI) is defined as being equal to the value of said CSI indicator for odd values of said Sequence Count (sc).

FIG. 7 summarizes how CI is defined in this case.

Third case: The length of the structure can be greater than 93 octets, and SRTS is used.

In FIG. 8, CI is then located in one additional bit field of the P format, i.e. the Change Indicator (CI) is defined as being equal to the value of an additional bit of a pointer format sent within a SAR_PDU payload.

FIG. 8 summarizes how CI is defined in this case.

The use of the Change Indicator CI as defined above is the following:

The data structure change (CI change) is initiated by the source side through the signalling protocol. All the information required to implement the change of data structure are transmitted and "negotiated" at that time between source side and destination side. Examples of information transmitted include: bandwidth in the network to transport the new structure; length of the new data structure; User Data Length (UDL) of the SAR_PDU payload, etc.

In order to minimize the number of signalling messages between the source side and destination side, it is the destination side which actually implements the structure change in the AAL1 data stream (as opposed to the signalling protocol). Once the change of data structures is done on both sides, the signalling destination side acknowledges the change, in order to ensure that source side and destination side are working with the same data structure. The above will be illustrated later through examples, in relation to FIGS. 13 to 15.

Inversion of CI indicator to specify a data structure change:

The initial value of CI is 0. For a static SDT, CI=0 during all the connection. The structure change information is transported through the inversion of CI.

For case 1 as described above, CI is inverted in the first available opportunity where SC=0.

For case 2, CI is inverted in the first available opportunity where SC is odd.

For case 3, CI is inverted in the first available opportunity where a P format is sent.

The format change is applicable from the first structure alignment which follows the CI inversion. CI remains inverted for every cell which follows this change.

Acknowledgement of a CI modification:

A change is acknowledged through the inversion of CI in the reverse transmission path or direction. No data link control is required to recover lost cells. The new CI state is sent permanently up to the next change, therefore the protocol is robust and resists to any number of lost cells.

Split of the functions between AAL Type I and Signalling:

In order to allow a simple implementation in AAL Type 1, the minimum function associated with the processing of the CI indicator is defined in AAL Type 1.

The remaining functions; to allocate the resources in the network to fit with the new cell rate, and to handle network failures and contentions when both sides want to perform a change at the same time are in the scope of the signalling protocol. A proper sequence of operation between the signalling layer and the AAL Type 1 layer permits optimizing the protocol.

The sequence is split into four phases:

a. Negotiation of the change by the signalling layer.

This phase allocates the network resources associated to the new cell rate; handles the contentions when both sides want to initiate a change at the same time, and exchanges the characteristics of the new structure. When this phase is complete, both sides are guaranteed that no data will be lost in the next phase.

b. Change of the data structure from one end to the other by AAL Type 1.

The protocol is optimized when it is the AAL Type 1 entity of the destination side which initiates the change.

c. Change of the data structure in the reverse direction by AAL Type 1.

d. Acknowledgement of the change by signalling.

Figure 10:
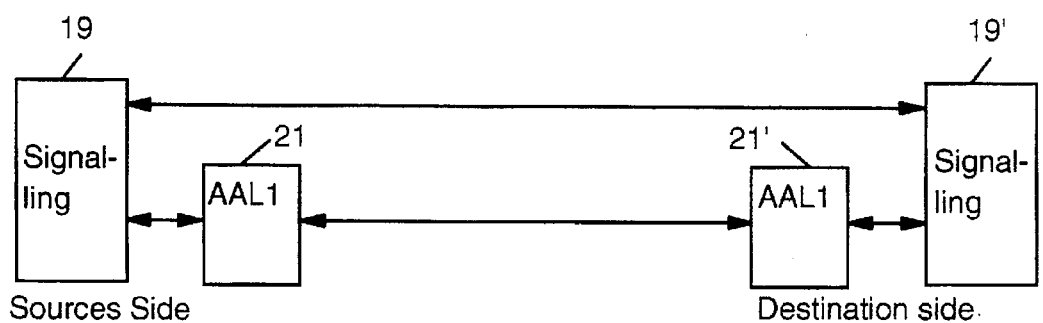
FIG. 10 is a block showing the function location, in a source or destination side terminal, between signalling entities performing control functions and AAL Type 1 entities performing data transfer.

Interface with the signalling entity:

Referring to FIG. 10, the AAL Type 1 entity 21 can receive 3 messages from the signalling entity 19:

1. Be_Prepared_To-Receive : This message specifies that the peer AAL Type 1 entity will initiate a change, and what the configuration of the new data structure is.

2. Initiate_Change: This message requests to initiate a structure change, and what the configuration of the new data structure is.

3. Cancel_Change : This message cancels the request initiated by the last Be_Prepared_To_Receive primitive.

This primitive is not mandatory, but is defined to enhance the robustness of the protocol.

The AAL Type 1 entity 21 can send one primitive to the signalling entity 19:

1. Initiate_Change_Reply : Acknowledges the structure change initiated by an Initiate_Change primitive.

Figure 11:
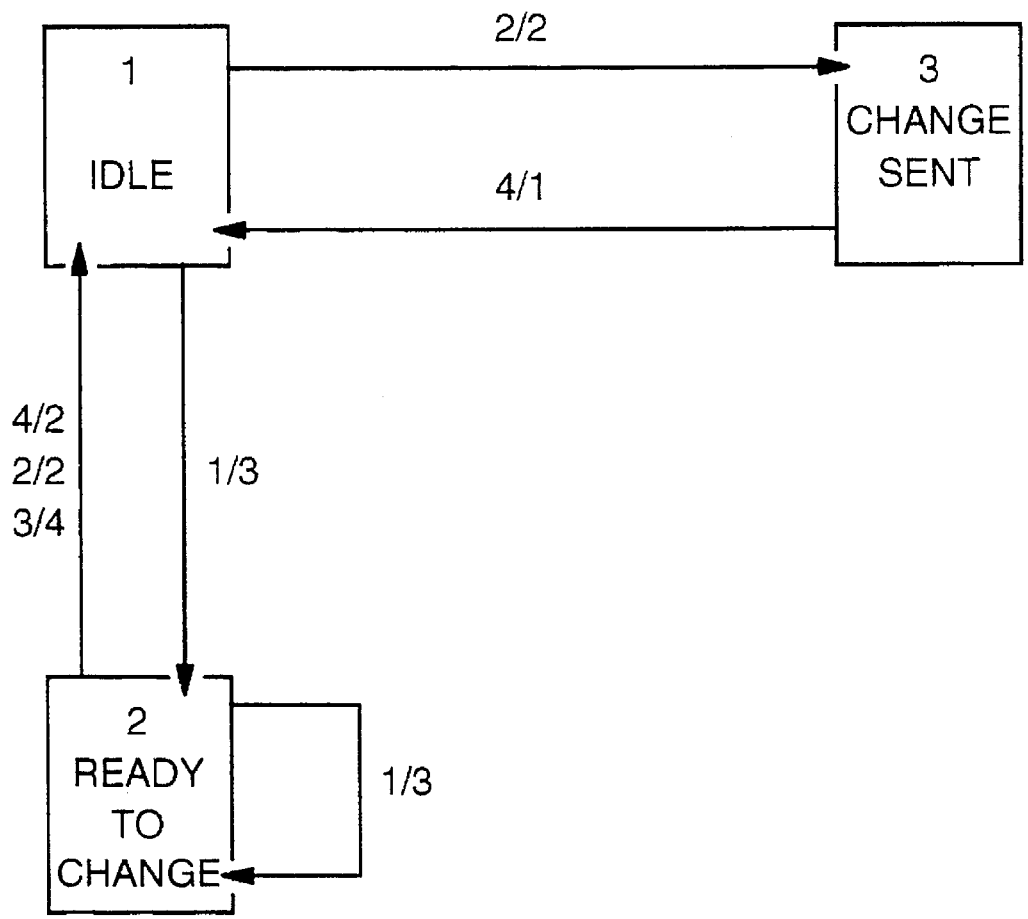
FIG. 11 is a block diagram showing a Finite State Machine diagram in an AAL1 entity, capable of performing a dynamically structured data transfer (DSDT) method according to the invention.

Method implementation with Finite State Machines:

In FIG. 11, Finite State Machines may be used to exemplify a possible implementation of the methods according to the invention. The following Finite State Machines describe the general protocol based on the AAL Type 1 protocol and its interfaces with the local signalling entity 19 and the peer AAL Type 1 entity 21', both shown in FIG. 10.

Definition of Events from the signalling entity:
 1. Be_Prepared_To_Receive
 2. Initiate_Change
 3. Cancel_Change. It is to be noted that this event is not mandatory for the protocol. It is defined to add robustness and to avoid monitoring a CI inversion when it is not needed.

Definition of events from the peer AAL entity:
 4. Invert CI and change structure List of Actions for the peer signalling entity:
 1. Initiate_Change_Reply List of Actions for the peer AAL entity:
 2. CI Inversion request and Structure change
 3. Store the new structure parameters
 4. Ignore the new structure parameters List of States:
 1. Idle
 2. ready_To_Change
 3. Change_Initiated The above is summarized in FIG. 11, where the notations are the following:

States are represented by boxes

Transitions are represented by arrows

Event number / Action number pairs are associated to transitions.

The initial state is idle.

From a current state (represented by a state box), when an Event (represented by an Event number) is received, it triggers a transition to the next state (represented by an arrow to a state box), and generates an action (represented by an Action number).

A finite State Machines matrix is represented in FIG. 12. The notations are the following:

States are listed on Y axis

Events are listed on X axis

New state number / Action number pairs are associated to transitions.

From a current state (represented on a line in Y axis), when an Event (represented on a column in X axis) is received, it triggers a transition to the next state (represented by a State number), and generates an action (represented by an Action number).

As a matter of example, a generic signalling protocol will now be used to illustrate the AAL Type 1 protocol and the interface covers all the possible operations.

Figure 13:
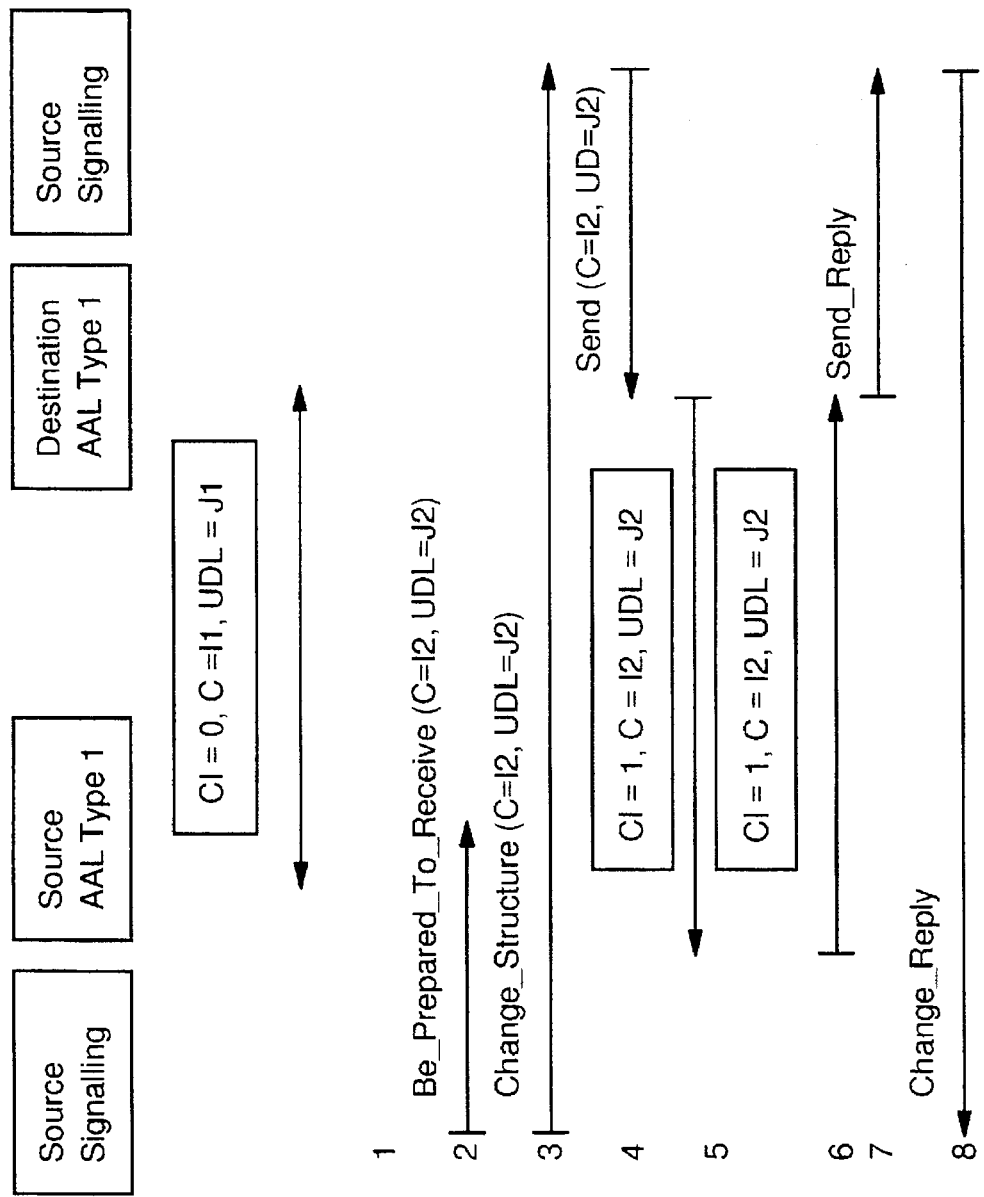
FIG. 13 shows a scenario to change a data structure using a generic signalling protocol.

FIG. 13 shows a method in steps 1–8 to change a data structure using a generic signalling protocol for a Valid Structure Change, with:

CI=Change Indicator
C=Number of Bytes in the Structure
UDL=User Data Length
The initial value of CI=0, C=I1, and UDL=J1.

1. AAL Type 1 data is exchanged both ways with CI=0, a structure length=I1, and a User Data Length=J1.

2. Signalling source sends the message "Be_Prepared_To_To_Receive" to AAL Type 1 source to specify the new structure that it will receive when CI will be inverted.

3. Signalling source sends the message "Change_Structure" to Signalling destination and specifies the new structure.
4. Signalling destination sends the message "Send" to AAL Type 1 destination entity and specifies the new structure.
5. AAL Type 1 destination inverts CI in the first even SC for a non-P format, and changes the format from the first structure alignment which follows.
6. AAL Type 1 source detects the CI inversion from the destination. It inverts the CI in the first even SC for a non-P format, and uses the new format from the first structure alignment which follows.
7. AAL Type 1 destination detects the CI inversion, and sends the message "Send_Reply" to Signalling destination.
8. Signalling destination sends the message "Change_Reply" to acknowledge the completion of the operation.

Figure 14:
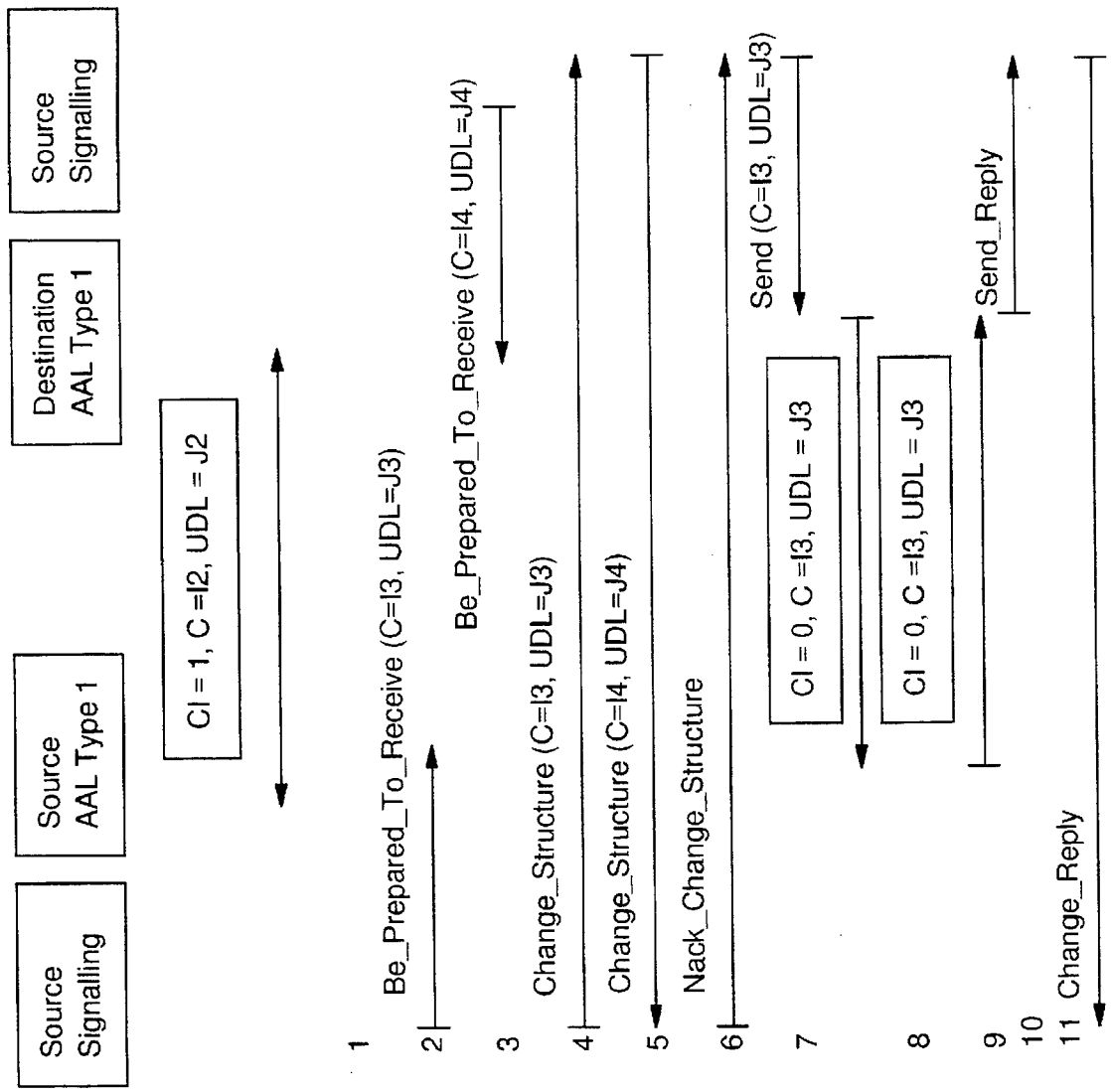
FIG. 14 shows a scenario to change a data structure in case of a contention between source side and destination side.

FIG. 14 shows a method in steps 1–11 to change a structure with contention.

The initial value of CI=1, C=I2, and UDL=J2.

1. AAL Type 1 data is exchanged both ways with CI=0, a structure length=I2, and a User Data Length=J2.
2. Signalling source sends the message "Be_Prepared_To_Receive" to AAL Type 1 source to specify the new structure that it will receive when CI will be inverted.
3. Signalling destination sends the message "Be_Prepared_To_Receive" to AAL Type 1 destination to specify the new structure that it will receive when CI will be inverted.
4. Signalling source sends the message "Change_Structure" to Signalling destination and specifies the new structure.
5. Signalling destination sends the message "Change_Structure" to Signalling source and specifies the new structure.
6. Signalling source is defined contention winner, and rejects the change structure from the Signalling destination.
7. Signalling destination sends the message "Send" to AAL Type 1 destination and specifies the new structure.
8. AAL Type 1 destination inverts CI in the first even SC for a non-P format, and changes the format from the first structure alignment which follows.
9. AAL Type 1 source detects the CI inversion from the destination. It inverts the CI in the first even SC for a non-P format, and uses the new format from the first structure alignment which follows.
10. AAL Type 1 destination detects the CI inversion, and sends the message "Send_Reply" to Signalling destination.
11. Signalling destination sends the message "Change_reply" to acknowledge the completion of the operation.

Figure 15:
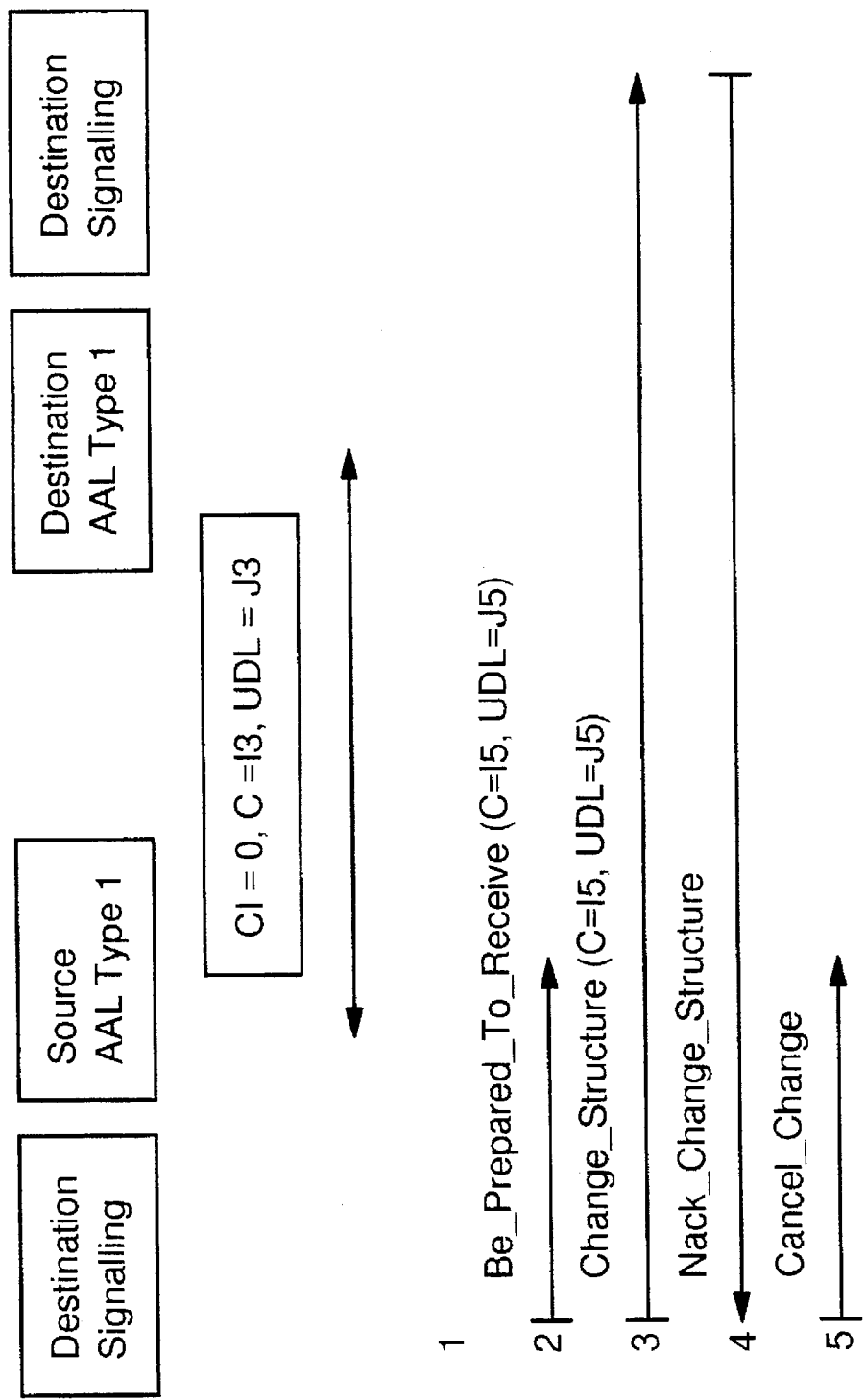
FIG. 15 shows a scenario to abort the change of a structure.

FIG. 15 shows the scenario to abort the change of a structure.

The initial value of CI=0, C=I3, and UDL=J3.

1. AAL Type 1 data is exchanged both ways with CI=0, a structure length=I3, and a User Data Length=J3.
2. Signalling source sends the message "Be_Prepared_To_Receive" to AAL Type 1 source to specify the new structure that it will receive when CI will be inverted.
3. Signalling destination sends the message "Be_Prepared_To_Receive" to AAL Type 1 destination to specify the new structure that it will receive when CI will be inverted.
4. Signalling destination rejects the change structure from the Signalling source.
5. Signalling source sends the message "Cancel_Change" to AAL Type 1 source to cancel the Be_Prepared_To_Receive message.

From the above specification and examples, the method according to the invention presents a series of advantages over the prior art:

Both sides of a transmission can add or suppress any channel. Contention when both sides want to perform an operation at the same time is resolved ahead of time through the out-band signalling protocol.

In-band signalling information is kept at a minimum, using an existing AAL format. Further, the interface with the signalling layer is simple. The interface requires 3 primitives between the Signalling layer and AAL Type 1, and 1 primitive between the AAL Type 1 and Signalling layer. This generic interface permits interfacing multiple signalling.

The method guarantees that when no cell is lost, the destination is able to detect the structure change in the first occurrence where it occurs. If cells are lost just before the occurrence of the structure change, the method guarantees to recover the structure boundary.

The method is robust: contentions and bandwidth reservation are processed before a change is performed between AAL Type 1 entities. The signalling protocol can also complete a change operation only when both AAL Type 1 entities have executed the change operation.

While the invention has been described with respect to several embodiments, it should be apparent to those skilled in the art that various changes and modifications can be made in the details of the steps and parts without departing from the spirit and scope of the invention as defined in the appended claims.

We claim:

1. In an Asynchronous Transfer Mode (ATM) communications environment adapted for the transmission on a data channel of data structures transmitted at a constant bit rate between at least a source side and a destination side both connected to respective end users, a method for dynamically changing the bit rate of said data structures, comprising the steps of:
 a) defining within said data channel a Change Indicator (CI) indicative of an end user's request for a bit rate change within said data structures;
 b) continuously transmitting said Change Indicator from the source side to the destination side, along with the data structures on said data channel;
 c) modifying the value of said Change Indicator upon receipt at said destination side of a user's request of a bit rate change; and
 d) acknowledging the modification of the value of said Change Indicator at said source side, whereby the transmission of data structures continues on the data channel with a new constant bit rate.

2. The method according to claim 1, wherein said Change Indicator is a one-bit logical value (0 or 1), a change in the data structure bit rate being simply indicated by inverting the value of said Change Indicator.

3. The method according to claim 2, wherein said Change Indicator modification is acknowledged by inverting said Change Indicator in the data channel transmitted along the reverse path, from said destination side to said source side, whereby both sides of the data transmission are working with similar data structures.

4. The method according to claim 3 wherein said data structures including AAL type 1 Protocol Data Units (SAR_PDU) comprising a 47 bytes SAR_PDU and a one byte SAR_PDU header including a Sequence Count Field (SC) and a Convergence Sublayer Indicator (CSI), said Change Indicator being transported in the AAL Type 1 header along with the data.

5. The method method according to claim 4, wherein the current value of said Change Indicator (CI) is derived from a combination of current values of said Sequence Count Field (SC) and of said Convergence Sublayer Indicator (CSI).

6. The method according to claim 5 wherein the data structure has a length of less than 93 bytes, the Change Indicator (CI) is defined as being equal to the inverted value of said CSI indicator for a Sequence Count of 0 (SC=0), and equal to the value of said CSI indicator for even values of said sequence count (SC).

7. The method according to claim 5 wherein the data structure has a length greater than 93 bytes, the Change indicator (CI) is defined as being equal to the value of said CSI indicator for odd values of said Sequence Count (SC).

8. The method according to claim 5 wherein the data structure has a length greater than 93 bytes, the Change Indicator (CI) is defined as being equal to the value of an additional bit included as a pointer format sent within a SAR_PDU payload.

9. The method according to claim 3 wherein the sequence of operations for changing a given data structure is partitioned over an ATM signalling channel and an ATM data channel and includes the steps of:
   a) negotiating the CI change within the signalling channel;
   b) changing the data structure by sending a changed CI indicator in a first direction over the ATM data channel;
   c) changing the data structure by sending a changed CI indicator in a second direction, opposite to said first direction; and
   d) acknowledging the CI indicator change over said ATM.

10. In an Asynchronous Transfer Mode (ATM) communications environment adapted for the transmission on a data channel of data structures transmitted at a constant bit rate between at least a signalling source and a destination side both connected to respective end users, a method to change a data structure using a generic signalling protocol for a Valid Structure Change with CI=Change Indicator; C=number of bytes in the structure; UDL=user data length, said method comprising the steps of:
   a) exchanging AAL Type 1 data both ways between the source side and the destination side with CI=0, C=I1, and the User Data Length=J1;
   b) sending a message "Be_Prepared_To_Receive" to AAL Type 1 from the signaling source to an AAL source to specify a new structure that such source will receive when CI will be inverted;
   c) sending a message "Change_Structure" from the source side to the destination specifying the new structure;
   d) sending a message "Send" to an AAL Type 1 destination entity and specifying the new structure;
   e) inverting CI by an AAL Type 1 destination entity in the first even sequence count (SC) for a non-P format, and changing the format from the first structure alignment which follows;
   f) detecting the CI inversion by the AAL Type 1 source from the destination, the AAL Type 1 source inverting the CI in the first even SC for a non-P format, and using the new format from the first structure alignment which follows;
   g) detecting the CI inversion by the AAL Type 1 destination, and sending a message "Send_Reply" to the destination; and
   h) sending a message "Change_Reply" by the destination to acknowledge the completion of the operation.

11. In an Asynchronous Transfer Mode (ATM) communications environment adapted for the transmission on a data channel of data structures transmitted at a constant bit rate between at least a signalling source and a signalling destination both connected to respective end users, a method to change a data structure using a generic signalling protocol for a Valid Structure Change with contention where CI=Change Indicator; C=number of bytes in the structure; UDL=user data length, and the initial values are CI=1, C=I2, and UDL=J2, said method comprising the steps of:
   a) exchanging AAL Type 1 data both ways between the signalling source and destination with CI=0, a structure length=I2, and a User Data Length=J2;
   b) sending a signalling source message "Be_Prepared_To_Receive" to an AAL Type 1 source to specify a new structure that such source will receive when CI will be inverted;
   c) sending a signalling destination message "Be_Prepared_To_Receive" to an AAL Type 1 destination to specify the new structure that such destination will receive when CI will be inverted;
   d) sending the signalling source a message "Change_Structure" to the signalling destination and specifying the new structure;
   e) sending the signalling destination a message "Change_Structure" to the signalling source and specifying the new structure;
   f) defining the signalling source as the contention winner, and rejecting the change structure from the signalling destination;
   g) sending the signalling destination a message "Send" to the AAL Type 1 destination and specifying the new structure;
   h) the AAL Type 1 inverting CI in the first even SC for a non-P format, and changing the format from the first structure alignment which follows;
   i) the AAL Type 1 source detecting the CI inversion from the destination and inverting the CI in the first even sequence count (SC) for a non-P format, and using the new format from the first structure alignment which follows;
   j) the AAL Type 1 destination detecting the CI inversion, and sending a message "Send_Reply" to the signalling destination; and
   k) the signalling destination sending a message "Change_reply" to acknowledge the completion of the operation.

12. In an Asynchronous Transfer Mode (ATM) communications environment adapted for the transmission on a data channel of data structures transmitted at a constant bit rate between at least a 4 signalling source and a signalling destination both connected to respective end users, a method to abort a change in a data structure using a generic signalling protocol for a Valid Structure Change where CI=Change Indicator; C=number of bytes in the structure; UDL=user data length, said method comprising the steps of:
   a) exchanging AAL Type 1 data both ways between the signalling source and the signalling destination with CI=0, C=I3, and a User Data Length=J3;

b) sending a message "Be_Prepared_To_Receive" from the siganlling source to an AAL Type 1 source to specify a new structure that the AAL Type 1 source will receive when CI will be inverted;

c) sending a message "Be_Prepared_To_Receive" from the signalling destination to an AAL Type 1 destination to specify the new structure that AAL Type 1 destination will receive when CI will be inverted;

d) rejecting the change structure by the signalling destination from the signalling source; and e) sending a message "Cancel_Change" by the signalling source to the AAL Type 1 source to cancel the Be_Prepared_To_Receive message.

* * * * *